United States Patent
Yang et al.

(10) Patent No.: US 11,310,383 B2
(45) Date of Patent: Apr. 19, 2022

(54) LID POSITION DETERMINATIONS BASED ON SCANS OF ZONES

(71) Applicant: Hewlett-Packard Development Company, L.P., Spring, TX (US)

(72) Inventors: Ai-Qiang Yang, Singapore (SG); Choon Hwee Yap, Singapore (SG); Tiang Kok Hun, Singapore (SG); Kuan Soon Oong, Singapore (SG); Ganlin Tang, Singapore (SG)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/296,621

(22) PCT Filed: Jul. 15, 2019

(86) PCT No.: PCT/US2019/041862
§ 371 (c)(1),
(2) Date: May 25, 2021

(87) PCT Pub. No.: WO2021/010973
PCT Pub. Date: Jan. 21, 2021

(65) Prior Publication Data
US 2022/0006915 A1 Jan. 6, 2022

(51) Int. Cl.
*H04N 1/00* (2006.01)

(52) U.S. Cl.
CPC ..... *H04N 1/00777* (2013.01); *H04N 1/00551* (2013.01); *H04N 1/00689* (2013.01); *H04N 1/00732* (2013.01); *H04N 1/00734* (2013.01)

(58) Field of Classification Search
None
See application file for complete search history.

(56) References Cited

U.S. PATENT DOCUMENTS

| 7,006,263 | B2 * | 2/2006 | Takahashi | H04N 1/1017 358/442 |
| 7,782,498 | B2 * | 8/2010 | Hoshi | H04N 1/00708 358/474 |
| 8,326,204 | B2 | 12/2012 | Won | |
| 9,075,376 | B2 | 7/2015 | Utagawa et al. | |
| 9,118,784 | B2 | 8/2015 | Edwards et al. | |
| 10,353,650 | B2 * | 7/2019 | Tsukada | G03G 15/5004 |
| 2010/0053706 | A1 | 3/2010 | Jasinski et al. | |
| 2011/0122455 | A1 * | 5/2011 | Elliot | H04N 1/00063 358/406 |
| 2014/0160537 | A1 | 6/2014 | Tanaka | |
| 2015/0009518 | A1 * | 1/2015 | Kashiwagi | H04N 1/00734 358/1.13 |
| 2018/0309894 | A1 * | 10/2018 | Shimizu | H04N 1/0473 |
| 2019/0227426 | A1 * | 7/2019 | Hayamizu | H04N 1/00681 |

FOREIGN PATENT DOCUMENTS

EP   1622354 A2   2/2006

\* cited by examiner

*Primary Examiner* — Miya J Williams
(74) *Attorney, Agent, or Firm* — HP Inc. Patent Department

(57) ABSTRACT

A first zone and a second zone of a scan surface may be scanned by an image sensor. A lid may be coupled to the scan surface and have an open position and a closed position, the lid being to cover the first zone and the second zone when in the closed position. The position of a lid may be determined based on a comparison of a scan of the first zone and a scan of the second zone.

15 Claims, 3 Drawing Sheets

LID POSITION DETERMINATIONS BASED ON SCANS OF ZONES

BACKGROUND

Copiers, scanners, and related devices may have lids to cover a scanning surface. Whether a lid is open, closed, or in another position may affect the behavior of the device.

BRIEF DESCRIPTION OF THE DRAWINGS

Various examples will be described below referring to the following figures.

DETAILED DESCRIPTION

The position of a lid covering a scan surface may affect the behavior of a copier, scanner, or comparable device. Lifting of the lid may indicate a user is going to scan or copy a document. A device that is in a power-saving mode may wake up in response to lifting the lid.

The scanner of such devices may be used to detect whether the lid is open or closed. When the lid is covering the scan surface, contrasting portions of the lid may be detected by the scanner. As the lid is opened, the contrasting portions of the lid become blurred together. The scanner may scan zones of the scan surface from time to time, determining whether the lid is open or closed based on a comparison of the zones. If one zone is white and the other is black, detecting comparable shades of gray in both zones may indicate the lid has been opened. This may allow detection of a lid position without adding components specific to that purpose.

Figure 1:
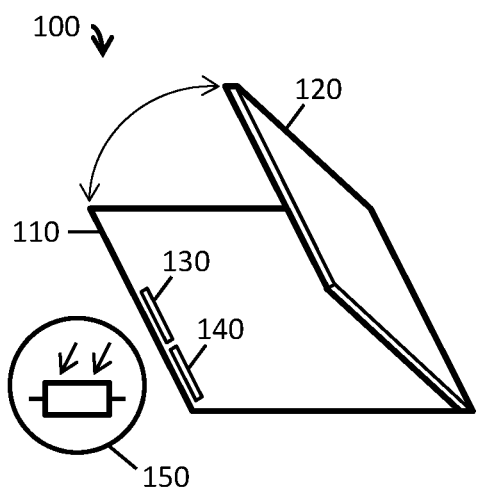
FIG. 1 shows an apparatus with a scan surface and a lid in accordance with various examples.

FIG. 1 shows an apparatus 100 with a scan surface 110 and a lid 120 in accordance with various examples. The apparatus 100 includes an image sensor 150. The scan surface 110 may be a sheet of glass or plastic, against which a document is placed for scanning or copying. The scan surface 110 includes a first zone 140 and a second zone 130. The first zone 140 and second zone 130 may not be apparent from an examination of the scan surface 110 but be particular locations imaged by the image sensor. The first zone 140 and second zone 130 may be outside the portion of the scan surface 110 that is scanned when scanning a document. The first zone 140 and second zone 130 may be positioned at other locations on the scan surface 110, such as at the top or bottom sides, or near a coupling point between the lid 120 and the scan surface 110.

The image sensor 150 may be a photoresistor, photodiode, charged coupling device, complementary metal-oxide semiconductor (CMOS) sensor, or any number of other imaging sensors. A light source may be used in conjunction with the image sensor, or be part of the sensor, and used to illuminate a document on the scan surface 110. While a scan is discussed throughout this document, scan is meant to include an image sensing portion of a scan operation, copy operation, or comparable functionality. The image sensor 150 may include or be part of a line scanner that scans lines across the scan surface 110 to assemble an image.

The lid 120 may be opened and closed. When closed, the lid 120 may cover the scan surface 110. Closing the lid 120 may assist with performing a scan or copy of a document placed on the scan surface 110. The lid 120 may generally provide a white image to the scan surface 110. The lid 120 may limit the amount of ambient light presented to the scan surface 110 during a scan.

Figure 2:
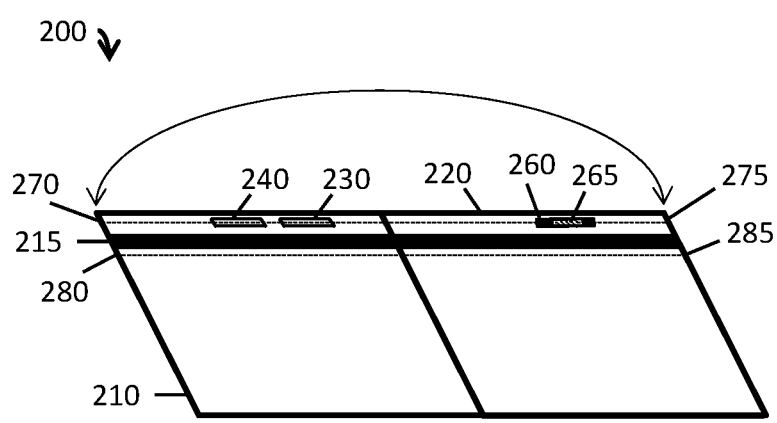
FIG. 2 shows an apparatus with a scan surface, lid, and document feed indicator in accordance with various examples.

FIG. 2 shows an apparatus 200 with a scan surface 210, lid 220, and document feed indicator 265 in accordance with various examples. The scan surface 210 includes a first zone 240 and a second zone 230. The first zone 240 and second zone 230 may be aligned along a first scan line 270 across the scan surface 210. A second scan line 280 across the scan surface 210 may indicate a location where the image sensor begins scanning a document placed against the scan surface 210. The image sensor may then scan the document starting at the second scan line 280 and in a direction heading away from the first scan line 270. The image sensor may rest in a park position along the first scan line 270. A divider 215 may separate the scan surface 210 into a park area for the image sensor and an area for placement of documents to be scanned. In various examples, the second scan line 280 may be on an opposite side of the scan surface 210 than the first scan line 270. Scanning a document may progress from the second scan line 280 towards the first scan line 270, halting just short of the first scan line 270.

The lid 220 may include a document feed indicator 265. The document feed indicator 265 may be part of an automatic document feed system that feeds documents from a tray onto the scan surface 210 to be scanned or copied. In various examples, the document feed indicator 265 may include or be part of a flag. The automatic document feed tray may be part of the lid 220. When the lid 220 is closed, a document placed in the tray may press a lever or other device that moves a flag. The flag may cause the document feed indicator 265 to move within a cutout 260 in the lid 220. The cutout 260 may include a hole in a surface of the lid 220 leading to a recessed area within the lid 220. The flag may be visible as the document feed indicator 265 when a scan is performed along scan line 275, which may correspond to the first scan line 270. The surface of the lid 220 near the cutout 260 may be a light color. When the lid 220 is closed, the cutout 260 may appear as a dark color when scanned. The dark color may be caused by the cutout 260 being recessed from the surface of the lid 220 or shaded from light generated as part of a scan. The cutout 260 may be darkened, such as through use of a different color plastic or by paint. Scan line 275 may correspond to the first scan line 270. When the lid 220 is closed, a scan along the first scan line 270 may image the portion of the lid 220 along scan line 275, which crosses the cutout 260 and document feed indicator 265. Scan line 285 may correspond to the second scan line 280, when the lid 220 is closed. When the lid 220 is closed and paper is not present in the automatic document feed tray, the document feed indicator 265 may be close to the scan surface 210 and show up as a lighter section within the cutout 260 when a scan is performed along scan line 275. When the lid 220 is closed and paper is present in the automatic document feed tray, the document feed indicator 265 may be recessed in the cutout 260 and away from the scan surface 210, which may cause the document feed indicator 265 to show up as darker or more blurred within the cutout 260 when a scan is performed along scan line 275.

In various examples, when the lid 220 is closed, the second zone 230 may line up with a light-colored portion of the lid 220. The first zone 240 may line up with the cutout 260. If a document feed indicator 265 is present, the first zone 240 may be across from a portion of the cutout 260 where the document feed indicator 265 is not present. This may allow a scan of the first scan line 270 to detect a dark color in the first zone 240 whether the document feed indicator 265 is indicating a document is present in the tray or not. The apparatus 200 may scan along the first scan line 270, including a scan of the first zone 240 and the second zone 230. If the lid is closed, the scan of the second zone 230 may detect the light coloring of the surface of lid 220, and the scan of the first zone 240 may detect dark coloring caused by the cutout 260. Comparing the scan of the first zone 240 with the scan of the second zone 230 may indicate a high level of contrast between the first zone 240 and the second zone 230, suggesting the lid is closed. As the lid 220 opens, the contrast between the first zone 240 and the second zone 230 may decrease, as the focal point of the scanner may be constrained to the scan surface 210 and its immediate vicinity. If the lid 220 is fully open, a scan of the first scan line 270 may be detecting the ambient light in the room or taking a scan of the ceiling, which may be very blurry due to its distance from the scan surface 210. The comparison of the scan of the first zone 240 and the scan of the second zone 230 may have low contrast, indicating the lid 220 may be open. The comparison may be able to differentiate between various states between the open and closed states, such as cracked slightly open or a transition state between open and closed.

In various examples, a scan of the first scan line 270 may detect whether the lid 220 is open as well as whether the document feed indicator 265 indicates the presence of a document. The second zone 230 may correspond to a light-colored section of the lid 220. The first zone 240 may correspond to a portion of the cutout 260 that will provide a dark image when scanned. A third zone may correspond to the document feed indicator 265, which may produce a darker or lighter colored image when scanned based on the presence or absence of a document in the document tray. A scan of the first scan line 270 may be performed. If there is a sufficient contrast between the first zone 240 and the second zone 230, the apparatus 200 may determine that the lid 220 is closed, otherwise the lid 220 may be open. If the lid 220 is closed, the apparatus 200 may analyze the scan of the first scan line 270 corresponding to the document feed indicator 265. Based on that analysis, the apparatus 200 may determine whether a document is in the tray. If the lid 220 is closed and there is no document in the tray, the apparatus 200 may wait some amount of time and perform another scan along the first scan line 270 for lid detection and automatic document feed detection. If the lid 220 is open or there is a document in the tray, the apparatus 200 may wake up from a power-saving mode or illuminate a control panel.

In various examples, the lid 220 may not include a cutout 260 corresponding to the first zone 240. The lid 220 may have a section corresponding to the first zone 240 that is formed of a darker plastic or that has a sticker or paint to provide a contrasting image. The corresponding section of the lid 220 may be colored in a particular way depending on the light used to perform the scan. For example, if a green light is used to perform the scan, the paint may be non-green to absorb the green light. Various colors of light may be used to perform the scan along the first scan line 270. Selection of the light may be based on the level of contrast provided between the first zone 240 and the second zone 230 when the lid is closed, or it may be based on an amount of power consumption when performing a scan of the first scan line 270. An intensity and duration of the light may be selected to avoid causing a distraction, such as a flashing light which may be visible while the lid 220 is open. The light may use a low intensity or a non-visible intensity that may still allow detection by the image sensor.

In various examples, the lid detection may operate regardless of ambient lighting conditions where the apparatus 200 is used. Whether the apparatus 200 is in a light room or a dark room, the contrast between the first zone 240 and the second zone 230 when the lid 220 is open may be sufficient to determine the lid 220 is open, as both zones may receive approximately the same level of ambient lighting.

In various examples, the locations of the first zone 240 and the second zone 230 may change along the first scan line 270, depending on the lid position. As the lid 220 is raised, the darker section provided by the cutout 260 may be seen by a scan as moving along the first scan line 270 towards the hinge or coupling between the lid 220 and the scan surface 210. The first zone 240 and second zone 230 may be made large enough to accommodate such movement or they may be selected based on where a darker section is detected.

Figure 3:
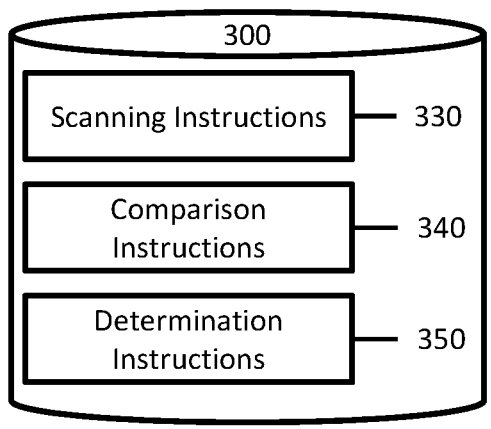
FIG. 3 shows a storage storing scanning instructions, comparison instructions, and determination instructions in accordance with various examples.

FIG. 3 shows a storage 300 storing scanning instructions 330, comparison instructions 340, and determination instructions 350 in accordance with various examples. The machine-readable instructions 330, 340, 350 may be for execution by a processor. Storage 300 may include a hard drive, solid state drive (SSD), flash memory, electrically erasable programmable read-only memory (EEPROM), or random access memory (RAM).

In various examples, the scanning instructions 330 may include instructions to perform a scan of a scan line on a scan surface. The scan line may scan a first zone and a second zone. The first zone may correspond to a dark-colored portion of a lid or a cutout in the lid, when the lid is closed. The second zone may correspond to a light-colored portion of the lid, when the lid is closed. Additional zones may be present, such as a zone corresponding to an indicator for an automatic document feed system, such as a flag.

In various examples, the comparison instructions 340 may include instructions to compare a scan of the first zone with a scan of the second zone. If the lid was closed when the scans were performed, there may be a high contrast between the scan of the first zone and the scan of the second zone. If the lid was open when the scans were performed, there may be a low contrast between the scan of the first zone and the scan of the second zone. The comparison instructions 340 may determine the contrast level. The comparison instructions 340 may make other comparisons, such as comparing particular color values. The comparison instructions 340 may compare the brightness of the scan of the first zone and the scan of the second zone. The comparison may result in a contrast value, such as a contrast ratio.

In various examples, the determination instructions 350 may determine whether a lid was open or closed, based on the comparison performed by the comparison instructions 340. A predetermined threshold for contrast may be used. If the contrast between the first zone and the second zone is higher than the predetermined threshold, the determination instructions 350 may determine that the lid was closed. If the contrast between the first zone and the second zone is lower than the predetermined threshold, the determination instructions 350 may determine that the lid was open. The determination instructions 350 may also analyze a third zone corresponding to a document feed flag or indicator. The first zone may correspond to a recess in the lid to create a dark area when scanned. The recess may extend beyond the first zone to include a document feed indicator corresponding to the third zone. While both the first zone and the third zone may correspond to a portion of the recess, the first zone and the third zone may be non-overlapping.

Figure 4:
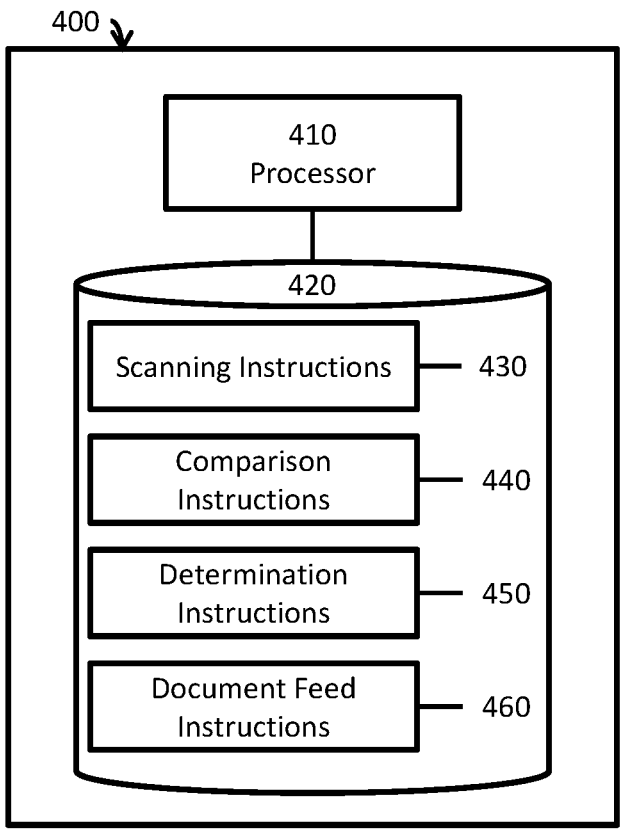
FIG. 4 shows a computer system with a processor and storage in accordance with various examples.

FIG. 4 shows a computer system 400 with a processor 410 and storage 420 in accordance with various examples. The processor 410 may be coupled to the storage 420, such as via a bus. The processor 410 may comprise a microprocessor, a microcomputer, a microcontroller, a field programmable gate array (FPGA), or discrete logic. The processor 410 may execute machine-readable instructions 430, 440, 450, 460 that implement the methods described herein, such as the method described in connection with FIG. 5.

Storage 420 may include machine-readable instructions 430, 440, 450, 460, such as scanning instructions 430, comparison instructions 440, determination instructions 450, and document feed instructions 460. The machine-readable instructions 430, 440, 450, 460 may be executable by the processor 410.

In various examples, the document feed instructions 460 may control an automatic document feed system. The determination instructions 450 or document feed instructions 460 may determine a document is present in the automatic document feed system. The document feed instructions 460 may cause an illumination of a button or a display. The document feed instructions 460 may control the automatic document feed system to be scanned or copied on a scan surface and then placed in an output tray.

Figure 5:
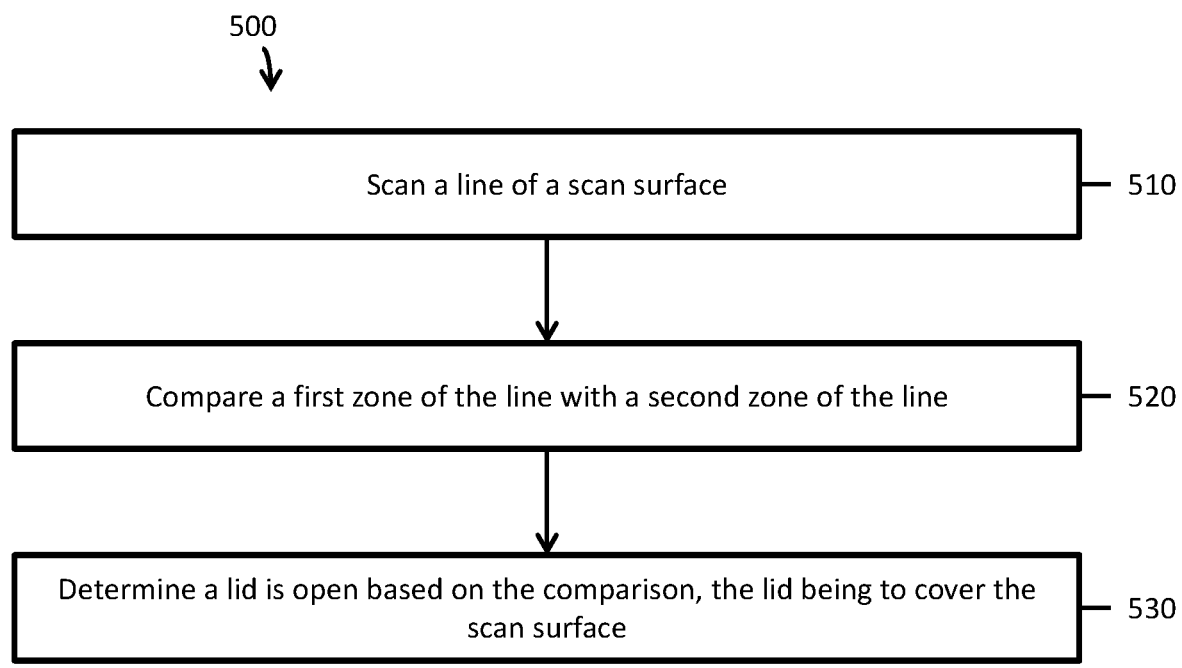
FIG. 5 shows a method of determining a lid is open based on a comparison of two zones of a scan line in accordance with various examples.

FIG. 5 shows a method 500 of determining a lid is open based on a comparison of two zones of a scan line in accordance with various examples. The method 500 includes scanning a line of a scan surface (block 510). The method 500 includes comparing a first zone of the line with a second zone of the line (block 520). The method 500 includes determining a lid is open based on the comparison, the lid being to cover the scan surface (block 530).

In various examples, the scanning or copying device may change state or operations depending on the determination of the lid position. If the device was in a standby mode, changing the lid position may cause the device to wake up. A button, liquid crystal display (LCD) or light emitting diode (LED) panel, or other control may be illuminated. A menu on a control panel may be updated or modified based on the state of the lid.

In various examples, the scan may scan a line through the first zone and the second zone. The line may be a single pixel width. Wider scans may be used to perform the comparison of the first zone and the second zone. The first zone and the second zone may be wide enough to provide overlap with corresponding sections on the lid, as some variation in positioning may be present due to the hinge or other mechanism used to couple the lid to the scan surface.

In various examples, the first zone may correspond to a section of the lid that includes a document feed indicator. Based on the scan, it may be determined that a document is present in a document feeder of the automatic document feed system. As a result, the automatic document feed system may cause the document to be scanned. In causing the document to be scanned, the automatic document feed system may first verify the lid is closed, rather than trying to perform a scan with the lid open.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. An apparatus comprising:
    a scan surface comprising:
        a first zone; and
        a second zone;
    an image sensor to scan the scan surface;
    a lid coupled to the scan surface, the lid having an open position and a closed position relative to the scan surface, the lid to cover the first zone and the second zone when the lid is in the closed position; and
    a controller to cause the image sensor to scan the first zone and the second zone, the controller to determine whether the lid is in the closed position based on a comparison of the scan of the first zone and the scan of the second zone.

2. The apparatus of claim 1, wherein the lid includes a flag to indicate a status of an automatic document feed, the flag covering a portion of the first zone when the lid is in the closed position.

3. The apparatus of claim 2, wherein the controller is to determine whether a document is present in the automatic document feed based on the scan of the first zone.

4. The apparatus of claim 1, wherein the lid comprises a hole, the hole covering a portion of the first zone when the lid is in the closed position.

5. The apparatus of claim 1, the scan surface comprising a third zone, the lid comprising a flag to indicate a status of a document feed, the flag to cover the third zone when the lid is in the closed position.

6. A non-transitory computer-readable medium to store machine-readable instructions that, when executed by a processor, cause the processor to:
    scan a first zone of a scan surface;
    scan a second zone of the scan surface;
    compare the scan of the first zone with the scan of the second zone; and
    determine whether a lid is open based on the comparison.

7. The computer-readable medium of claim 6, wherein execution of the instructions by the processor causes the processor to scan a third zone of the scan surface to generate an image of a document to be scanned, wherein the third zone is non-overlapping with the first zone.

8. The computer-readable medium of claim 6, wherein the comparison of the scan of the first zone with the scan of the second zone includes a comparison of a first brightness of the scan of the first zone with a second brightness of the scan of the second zone.

9. The computer-readable medium of claim 6, wherein execution of the instructions by the processor causes the processor to determine whether a document is present in a document feed based on the scan of the first zone.

10. The computer-readable medium of claim 6, wherein execution of the instructions by the processor causes the processor to scan the first zone using a green light.

11. A method comprising:
    scanning a line of a scan surface;
    comparing a first zone of the line with a second zone of the line; and
    determining a lid is open based on the comparison, the lid being to cover the scan surface.

12. The method of claim 11 comprising illuminating a control in response to the determination.

13. The method of claim 11, wherein scanning the line includes scanning a one pixel width line.

14. The method of claim 11 comprising:
    determining a document is present in a document feed based on the first zone; and
    scanning the document.

15. The method of claim 14, wherein the scanning the document is based on a determination that the lid is closed.

\* \* \* \* \*